(12) United States Patent
Breuer et al.

(10) Patent No.: US 10,062,399 B1
(45) Date of Patent: Aug. 28, 2018

(54) DISTRIBUTING TAPE DRIVE ABRASION

(71) Applicant: International Business Machines Corporation, Armonk, NY (US)

(72) Inventors: Marcus Breuer, Dalheim (DE); Bernd Freitag, Partenheim (DE); Frank Krick, Ockenheim (DE); Tim Oswald, Gimbsheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/856,248

(22) Filed: Dec. 28, 2017

(51) Int. Cl.
*G11B 5/40* (2006.01)
*G11B 5/187* (2006.01)
*G11B 5/31* (2006.01)
*G11B 5/52* (2006.01)

(52) U.S. Cl.
CPC ............. *G11B 5/40* (2013.01); *G11B 5/1871* (2013.01); *G11B 5/3106* (2013.01); *G11B 5/52* (2013.01)

(58) Field of Classification Search
CPC ...................... G11B 5/00813–5/00826; G11B 5/187–5/1871; G11B 5/3103–5/3106; G11B 5/40; G11B 5/48; G11B 5/4893; G11B 5/52; G11B 5/54–5/5517; G11B 5/584
USPC ............. 360/55, 69, 75, 77.12, 78.02, 78.12
See application file for complete search history.

(56) References Cited

U.S. PATENT DOCUMENTS

| 6,856,488 | B2 | 2/2005 | King |  |
| 9,153,259 | B2 | 10/2015 | Dee |  |
| 9,293,152 | B2 * | 3/2016 | Biskeborn | G11B 5/187 |
| 9,638,614 | B2 * | 5/2017 | Biskeborn | G01N 3/56 |
| 9,659,581 | B2 * | 5/2017 | Biskeborn | G11B 5/187 |
| 9,792,947 | B1 * | 10/2017 | Biskeborn | G11B 5/00813 |
| 9,892,751 | B1 * | 2/2018 | Harper | G11B 5/4893 |
| 9,892,753 | B2 * | 2/2018 | Biskeborn | G11B 5/00813 |
| 9,940,952 | B2 * | 4/2018 | Biskeborn | G11B 5/187 |
| 2012/0106003 | A1 | 5/2012 | Biskeborn |  |
| 2014/0204483 | A1 | 7/2014 | Cherubini |  |
| 2016/0203836 | A1 | 7/2016 | Biskeborn |  |
| 2017/0122857 | A1 * | 5/2017 | Biskeborn | G01N 3/56 |

(Continued)

FOREIGN PATENT DOCUMENTS

| JP | 2011187090 A | 9/2011 |
| JP | 2014013631 A | 1/2014 |

OTHER PUBLICATIONS

Breuer et al., "Tape Drive With Independent Transverse Motion of Transducer and Transducer Housing", U.S. Appl. No. 15/856,288, filed Dec. 28, 2017.

(Continued)

*Primary Examiner* — Wayne Young
*Assistant Examiner* — James L Habermehl
(74) *Attorney, Agent, or Firm* — Andrew Aubert; David B. Woycechowsky

(57) ABSTRACT

Some embodiments are directed to tape drive systems that oscillate the relative transverse position of the tape and magnetic head during seek operations (for example, by moving the head in the transverse direction). Some embodiments are directed to tape drive systems that select relative transverse position of the tape and magnetic head to counter uneven wear (for example, observed uneven wear, uneven wear predicted based on historical tape and drive usage data).

17 Claims, 10 Drawing Sheets

(56) References Cited

U.S. PATENT DOCUMENTS

2017/0178671 A1* 6/2017 Biskeborn .............. G11B 5/187

OTHER PUBLICATIONS

Arnold et al., "Trends in micropositioning", Pezo and Hybrid Drives, elektro technik, Nov. 13, 2007, 13 pages.
French, John, "Tape Heads—An Introduction", reprinted from MIX Magazine, vol. 10, No. 8, downloaded on May 31, 2017, 5 pages.
Klein, Olaf, "Powerful miniature drives for medical technology in corpore sano", KEM, Jun. 3, 2004, 9 pages.
Yeo et al. "A Facile Approach of Fabricating Ultra-Thin Wear Resistant Si/SiNx/C Overcoats for Magnetic Tape Recording Heads", ASME 2014 Conference on Information Storage and Processing Systems, Santa Clara, California, USA, Jun. 23-24, 2014, Conference Sponsors: Information Storage and Processing Systems Division, ISBN: 978-0-7918-4579-0, Copyright © 2014 by ASME, 3 pages.

* cited by examiner

DISTRIBUTING TAPE DRIVE ABRASION

BACKGROUND

The present invention relates generally to magnetic data tape read/write drives, and more particularly to managing deterioration of a read/write head on a magnetic data tape drive.

Magnetic data tape read/write drives are used to store and retrieve data on magnetic data tape cartridges. A plurality of magnetic data tape read/write drives can be logically connected to each other to comprise a tape library. A typical magnetic data tape read/write drive will have one or more read or write heads to perform read or write operations on magnetic data tape cartridges. Magnetic data tape cartridges include a finite length of magnetic tape. The magnetic tape is typically divided into a plurality of data bands that run parallel to each other along the length of the tape. The read/write head of a magnetic data tape read/write drive can include servo heads on the top and the bottom to move the read/write head perpendicular to the direction the magnetic tape is being spooled for the purpose of positioning the read/write heads over an appropriate data band.

When data is stored or retrieved on magnetic tape, it is typically located at a unique longitudinal position on a data band. Reading or writing data near the end of the length of the magnetic tape typically involves spooling the tape from one spool to another, with the magnetic tape passing across the read/write head of a magnetic data tape read/write drive. Prior to reading or writing data to magnetic tape, magnetic data tape read/write drives will typically "seek" to a starting position for the operation, either the beginning of a block of data or the beginning of an empty block to be written with data. This can occur at significant velocities (i.e., 15 meters per second).

It is known in the art that magnetic tape drive heads experience physical wear on their tape-facing surfaces when used extensively. This is due to: (i) the relative longitudinal direction motion between the magnetic tape head and various tapes being accessed by the tape head; and (ii) occasional contact between the head facing surfaces of the various tapes and the tape-facing surface of the head. To put it more colloquially, the tapes wear a groove in the tape head over time and use. Some prior art attempts to counter this issue by coating and/or lubricating the tape facing surface of the magnetic tape head with abrasion resistant material.

SUMMARY

A tape drive system for use with a tape medium that defines a longitudinal direction and a transverse direction, the tape drive system includes: a magnetic head including a tape facing surface; a head movement control sub-system; a tape movement control sub-system; and a head profile sub-system. The magnetic head is structured, connected, located, sized and shaped to magnetically read data from and/or magnetically write data to the tape medium while the tape medium moves in the longitudinal direction relative to the tape facing surface of the magnetic head. The tape movement control sub-system structured and/or programmed to control movement of the tape medium, with the movement including longitudinal direction movement relative to the tape facing surface of the magnetic head; the head profile sub-system is structured and/or programmed to store head profile information corresponding to an observed and/or estimated wear profile of the tape facing surface of the magnetic head. The head movement control sub-system and tape movement control sub-system are structured and/or programmed to control relative position and/or relative orientation of the tape facing surface of the magnetic head and a portion of the tape medium proximate to the magnetic head in a manner to counter uneven wear indicated by the wear profile information.

A method for use with an elongated magnetic tape medium defining a longitudinal direction and a transverse direction and a tape drive system including a magnetic head and a movement control sub-system, the method including the following operations (not necessarily in the following order): (i) controlling, by the movement control sub-system, the magnetic tape to move in the longitudinal direction relative to the magnetic head such that a various portions of the magnetic tape will come into close proximity to a tape facing surface of the magnetic head and the magnetic tape moves in the longitudinal direction; and (ii) while the magnetic tape is moving in the longitudinal direction, controlling, by the movement sub-system, the magnetic head to oscillate in the transverse direction.

A tape drive system for use with a tape medium that defines a longitudinal direction and a transverse direction, the tape drive system includes: a magnetic head including a tape facing surface; a head movement control sub-system; and a tape movement control sub-system. The magnetic head is structured, connected, located, sized and shaped to magnetically read data from and/or magnetically write data to the tape medium while the tape medium moves in the longitudinal direction relative to the tape facing surface of the magnetic head. The tape movement control sub-system structured and/or programmed to control movement of the tape medium, with the movement including longitudinal direction movement relative to the tape facing surface of the magnetic head. The head movement control sub-system and tape movement control sub-system are structured and/or programmed to effect oscillatory movement with respect to the relative transverse position of the tape facing surface of the magnetic head and a portion of the tape medium proximate to the magnetic head.

DETAILED DESCRIPTION

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
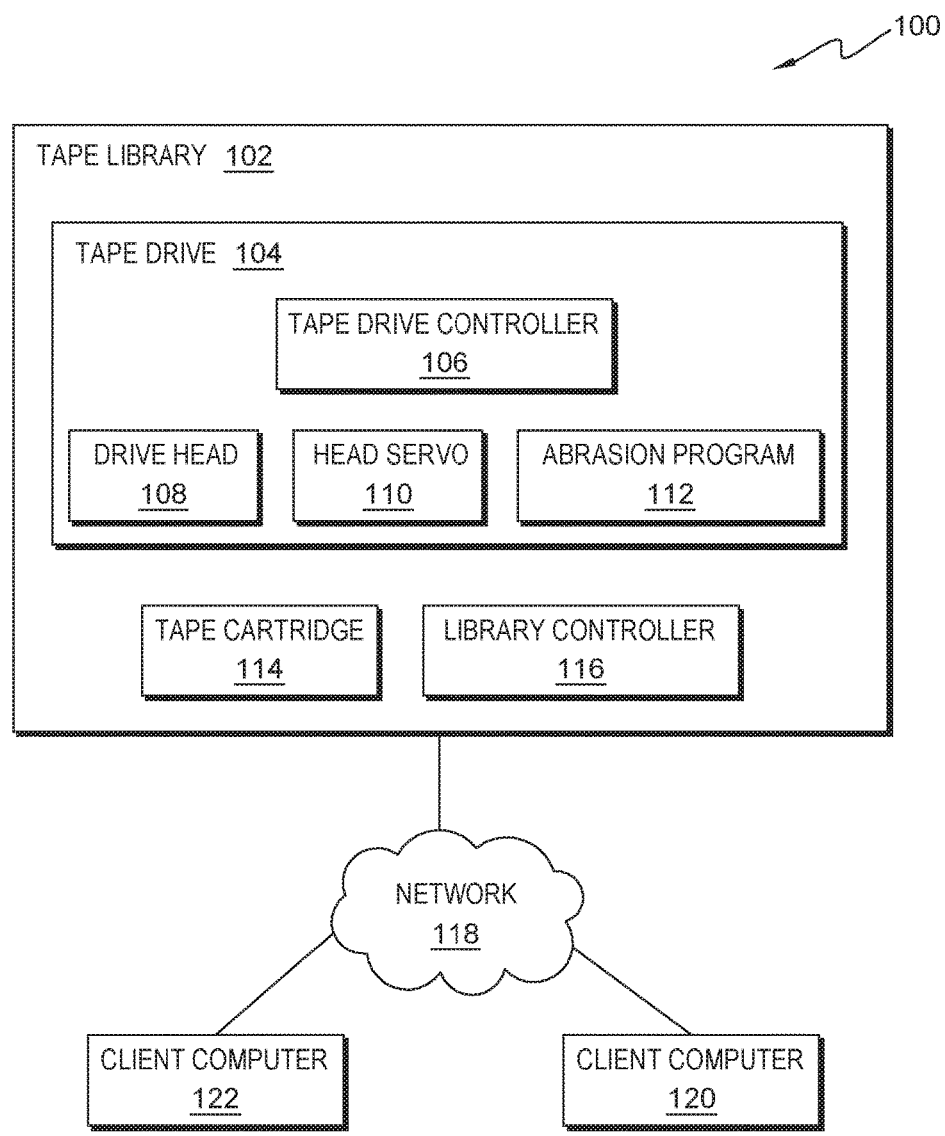
FIG. 1 is a block diagram illustrating a magnetic data tape library, in accordance with an embodiment of the present invention.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In one embodiment, tape library 102 may be a magnetic tape library that provides the capability to store data using a tape drive 104 and one or more tape cartridge 114. In one embodiment, tape library 102 may represent a plurality of interconnected physical tape libraries. In one embodiment, tape library 102 may include a plurality of tape drive 104.

In one embodiment, tape drive 104 may be a magnetic tape read/write drive within a tape library 102 that enables read or write operations on tape cartridge 114. In one embodiment, tape drive 104 may include a tape drive controller 106, a tape drive head 108, a head servo 110, and an abrasion program 112. In one embodiment, tape drive 104 may include one or more head servo 110, for movement of the tape drive head 108 in one or more directions. In one embodiment, tape drive 104 may include a plurality of tape drive controller 106.

In one embodiment, tape drive controller 106 may be an integrated chip within tape drive 104. In one embodiment, tape drive controller 106 may include computer readable storage, which may contain firmware instructions for the operation of components of tape drive 104, such as drive head 108 or head servo 110. In one embodiment, tape drive controller 106 may contain a microprocessor. In one embodiment, tape drive controller 106 might contain firmware instructions to operate head servo 110. In one embodiment, tape drive controller 106 may contain firmware instructions to operate magnetic tape drive head 108. In one embodiment, tape drive controller 106 may include abrasion program 112.

In one embodiment, tape drive head 108 may be a magnetic tape drive read/write head of tape drive 104 that provides a mechanism for reading data stored on tape cartridge 114. In one embodiment, drive head 108 is a component of tape drive 104 that provides a mechanism for writing data on tape cartridge 114. In one embodiment, drive head 108 is a component of tape drive 104 that provides a mechanism for reading data from and writing data to tape cartridge 114. In one embodiment, drive head 108 is operationally coupled to head servo 110 enabling drive head 108 to move transverse relative to the direction of spooling the magnetic tape of tape cartridge 114 to enable read or write operations on a plurality of data bands on the magnetic tape of tape cartridge 114.

In one embodiment, head servo 110 may be a magnetic tape drive read/write head servo such as an electric motor (e.g., servo motor, stepper motor, etc.) operationally coupled to drive head 108 and tape drive controller 106. In one embodiment, head servo 110 may include more than one motor, each implemented to apply force to drive head 108 to impart a change in position of drive head 108 in physical space. In one embodiment, head servo 110 positions drive head 108 transverse to the direction of spooling of the magnetic tape of tape cartridge 114.

In one embodiment, abrasion program 112 may be a firmware application stored within tape drive controller 106. In one embodiment, abrasion program 112 may be a firmware application stored within library controller 116. In one embodiment, abrasion program 112 may be a software application stored within library controller 116. In one embodiment, abrasion program 112 determines a signal amplitude input from drive head 108 to determine the position on drive head 108 corresponding to a data band on the magnetic data tape of tape cartridge 114 that is the most worn from previous operations. A signal amplitude is a parameter measured during the mounting of tape cartridge 114 to tape drive 102 that varies by tape cartridge material and drive head wear, which may become weaker as drive head wear increases the distance between the magnetic tape of tape cartridge 114 and drive head 108. In one embodiment, abrasion program 112 interprets a signal amplitude provided by drive head 108 to determine a position on drive head 108 corresponding to a data band on tape cartridge 114 that is the least worn from previous operations. In one embodiment, abrasion program 112 provides a mechanism for distributing abrasive wear on drive head 108 by measuring a signal amplitude and using head servo 110 to position drive head 108 in read/write position of one or more of the data bands on tape cartridge 114 during a substantial portion of the spooling of tape cartridge 114 during seek operations. In one embodiment, abrasion program 112 provides a mechanism for distributing abrasive wear on drive head 108 by measuring a signal amplitude and selecting the data band on tape cartridge 114 with the least amount of abrasive wear for the next write operation. In one embodiment, abrasion program 112 provides a mechanism for distributing abrasive wear on drive head 108 by measuring a signal amplitude and using head servo 110 to oscillate drive head 108 across the positions corresponding with data bands on tape cartridge 114 during a substantial portion of the spooling of tape cartridge 114 during seek operations. In one embodiment, abrasion program 112 provides a mechanism for tape library 102 to distribute abrasive wear across two or more tape drive 104 by measuring the fill rate of tape cartridge 114 and the historical usage of drive head 108 of each tape drive 104 to determine which of tape drive 104 is least likely to incur uneven abrasive wear on drive head 108.

In one embodiment, tape cartridge 114 may be a magnetic tape storage media (e.g., physical tapes, long cartridges, short cartridges, etc.). In one embodiment, tape cartridge 114 includes data storage capacity along one or more data bands of magnetic tape. In one embodiment, tape cartridge 114 may be a plurality of tape storage media within tape library 102.

In one embodiment, library controller 116 may be a component of tape library 102, such as an integrated circuit. In one embodiment, library controller 116 includes computer readable storage. In one embodiment, library controller 116 includes a microprocessor. In one embodiment, library controller 116 includes firmware instructions within computer readable storage that enable the operational coupling of tape library 102 components. For example, library controller 116 may enable tape library 102 to send a read command to tape drive 104 to read from tape cartridge 114, and to receive the resulting data from the read command and transfer via network 118 the resulting data to another device, such as client computer 120 or client computer 122.

In one embodiment, network 118 is the Internet representing a worldwide collection of networks and gateways that use TCP/IP protocols to communicate with one another. Network 118 may include wire cables, wireless communication links, fiber optic cables, routers, switches and/or firewalls. Tape library 102, client computer 120, and client computer 122 are interconnected by network 118. Network 118 can be any combination of connections and protocols capable of supporting communications between tape library 102, client computer 120, client computer 122, and abrasion program 112. Network 118 may also be implemented as a number of different types of networks, such as an intranet, a local area network (LAN), a virtual local area network (VLAN), or a wide area network (WAN). FIG. 1 is intended as an example and not as an architectural limitation for the different embodiments.

In one embodiment, client computer 120 and client computer 122 are clients connected to tape library 102 and may be, for example, a server computer, a desktop computer, a laptop computer, a tablet computer, a smart phone, a personal digital assistant (PDA), a thin client or any other electronic device or computing system capable of communicating with tape library 102. For example, client computer 120 might be a desktop computer capable of connecting to a network, such as network 118, to submit one or more read or write requests to client computer 122, which might be a server computer connected to tape library 102 and network 118 to process read or write operations directed towards tape library 102. In one embodiment, client computer 120 and client computer 122 might be any kind of device suitable for submitting one or more read or write requests to a tape library 102.

Figure 2:
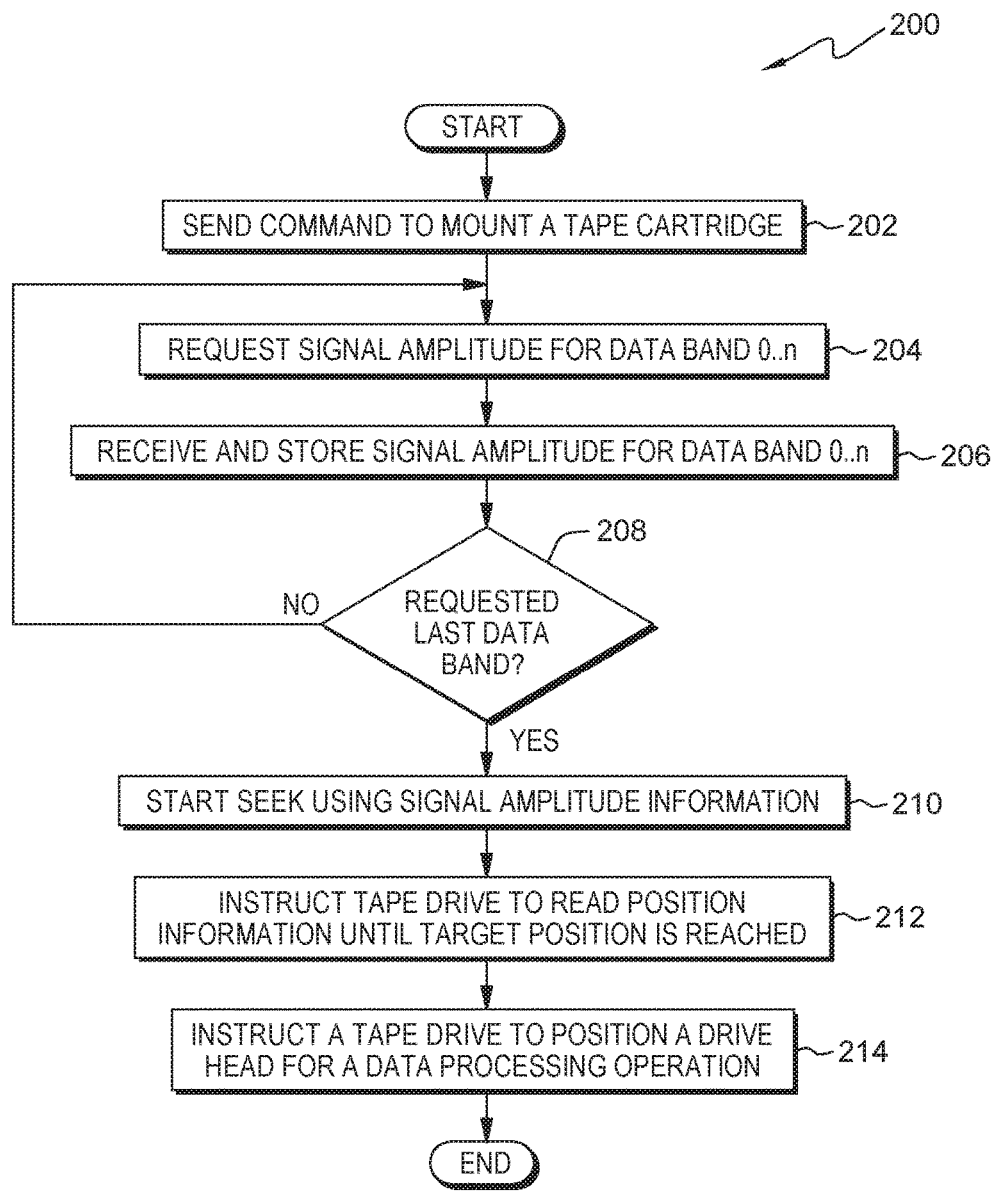
FIG. 2 is a flowchart depicting operational steps of an abrasion program for evenly distributing wear on the surface of a tape drive head during seek processes, in accordance with an embodiment of the present invention.

FIG. 2 depicts a flowchart of operational steps of an anti-abrasion program, such as abrasion program 112 of FIG. 1, generally designated 200, for distributing surface abrasion across magnetic tape read/write drive heads, such as drive head 108 of FIG. 1, during seek operations based upon measurements of current levels of abrasion at one or more positions on a magnetic tape read/write drive head in accordance with an embodiment of the present invention.

Abrasion program 112 sends a command to mount a tape cartridge for data processing by a tape drive (202). In one embodiment, responsive to receiving tape cartridge 114 from tape library 102 and a request from tape library 102 for a data processing operation on tape cartridge 114, abrasion program 112 instructs tape drive controller 106 to position tape cartridge 114 for read/write operations by drive head 108. For example, abrasion program 112 may instruct tape drive controller 106 to operate motors within tape drive 104 to move tape cartridge 114 into operational coupling with a spindle such that the magnetic tape within tape cartridge 114 may rotate to facilitate longitudinal movement of the magnetic tape across drive head 108.

Abrasion program 112 requests a signal amplitude for a data band (204). In one embodiment, abrasion program 112 requests the signal amplitude of the current data band of the magnetic tape of tape cartridge 114 currently mounted to tape drive 104. In one embodiment, where abrasion program 112 has already requested the signal amplitude of the current data band, abrasion program 112 requests the signal amplitude for the next data band of the magnetic tape of tape cartridge 114. For example, where data band 0 is currently mounted, and abrasion program has already requested the signal amplitude for data band 0, abrasion program 112 requests the signal amplitude for data band 1. In one embodiment, responsive to abrasion program 112 mounting tape cartridge 114 to tape drive 104, abrasion program 112 requests the signal amplitude of the current data band positioned for data processing operations by drive head 108 from tape drive controller 106. The signal amplitude is a numerical value for the quality and strength of the magnetic data connection between drive head 108 and tape cartridge 114. For example, when tape cartridge 114 is first mounted abrasion program 112 may request the signal amplitude for data band 0. As drive head 108 suffers abrasive damage over time caused by friction from magnetic tape moving longitudinally across the surface of drive head 108, the distance between drive head 108 and the magnetic tape of tape cartridge 114 increases, typically resulting in a weaker signal amplitude. A weaker signal amplitude can introduce errors into data processing operations. Uneven abrasive wear across the surface of drive head 108 can also introduce damage to tape cartridge 114 by forming grooves in the surface of drive head 108 that may contact the magnetic tape of tape cartridge 114 as it moves longitudinally across drive head 108.

Abrasion program 112 receives and stores a signal amplitude for a data band (206). In one embodiment, abrasion program 112 receives and locally stores the previously requested signal amplitude of the current data band of the magnetic tape of the tape cartridge 114 currently mounted to tape drive 104. For example, in one embodiment, responsive to abrasion program 112 mounting tape cartridge 114 to tape drive 104, abrasion program 112 receives from tape drive controller 106 the signal amplitude of data band 0 of tape cartridge 114, which abrasion program 112 stores in the local memory of tape drive controller 106. In one embodiment, abrasion program 112 stores the signal amplitude of data band n, where n is the data band requested at 204. In another embodiment, abrasion program 112 stores the signal amplitude values for each of the data bands in a table, and updates the table each time abrasion program 112 mounts a new tape cartridge, such as tape cartridge 114, to a tape drive, such as tape drive 104. Each time abrasion program 112 updates the table, abrasion program 112 compares the new signal amplitude for each data band to a threshold value that indicates a level of wear to drive head 108 is present capable of introducing damage to tape cartridge 114. If the comparison indicates that the current signal amplitudes are equal or greater than this value, abrasion program 112 generates an error message and sends the error message to tape library 102 indicating that a library administrator should service tape drive 104 regarding drive head 108. In another embodiment, the error message identifies tape drive 104 for removal from tape library 102 due to accumulated abrasive damage to drive head 108.

Abrasion program 112 determines whether it has requested the last data band (208). In one embodiment, abrasion program 112 determines whether it has requested, received, and locally stored for the current data processing operation a signal amplitude for each of the data bands of tape cartridge. In one embodiment, abrasion program 112 requests from tape drive controller 106 the number of data bands on tape cartridge 114 and generates a table in the local memory of tape drive controller 106 to store the signal amplitude value of each data band. In one embodiment, abrasion program 112 determines whether it recorded a signal amplitude for each of the data bands of tape cartridge 114 by reading the table and identifying the next data band of tape cartridge 114 that does not yet have a signal amplitude value recorded. In one embodiment, the table entries for data bands of tape cartridge 114 that have no signal amplitude value indicate which data bands that abrasion program has not yet requested, received, and locally stored a signal amplitude for in the memory of tape drive controller 106. In another embodiment, the table may be pre-populated with entries for signal amplitudes of data bands of tape cartridge 114 from previous data processing operations on tape drive 104.

Responsive to a determination that abrasion program 112 has not requested the last data band (NO branch, 208), abrasion program 112 requests a signal amplitude of a data band (204). In one embodiment, responsive to a determination that abrasion program 112 has not requested, received, and locally stored a signal amplitude for each data band (NO branch, 208), abrasion program 112 continues requesting signal amplitudes for the data bands of tape cartridge 114 (204). In one embodiment, responsive to a determination that there are entries on the table for the data bands of tape cartridge 114 that have not yet had a signal amplitude assigned, abrasion program 112 continues requesting signal amplitudes from tape drive controller 106 (204). For example, where abrasion program 112 examines the table of signal amplitudes for the current mounting of tape cartridge 114 and finds a signal amplitude for data band 0 but no signal amplitude for data bands 1, 2, and 3, abrasion program 112 would follow the NO branch, now requesting the signal amplitude of data band 1.

Responsive to a determination that abrasion program 112 has requested the last data band (YES branch, 208), abrasion program 112 starts a seek operation using signal amplitude information (210). In one embodiment, responsive to a determination that abrasion program 112 has requested, received, and locally stored a signal amplitude for each data band (YES branch, 208), abrasion program 112 determines which data band of tape cartridge 114 to use for the seek operation. In one embodiment, abrasion program 112 compares the signal amplitude in the table of each data band of tape cartridge 114 and selects the data band with the greatest signal amplitude for use during the seek operation. For example, where the table indicates that data band 0 possesses the lowest signal amplitude and data bands 1, 2, and 3 have the greatest signal amplitude, abrasion program 112 may select data band 1 for the seek operation of a data processing request.

Abrasion program 112 starts a seek operation using signal amplitude information (210). In one embodiment, where tape cartridge 114 has a plurality of data bands numbered 0 . . . n, abrasion application 112 starts a seek operation on a data band using signal amplitude information. In one embodiment, abrasion program 112 instructs tape drive controller 106 to begin a seek operation to the longitudinal component of a targeted address on tape cartridge 114, with drive head 108 positioned for data processing operation on a data band of tape cartridge 114 based upon the value of the signal amplitudes of each of the data bands. The data band of the targeted address and the data band with the highest signal amplitude may differ. In one embodiment, abrasion program 112 receives the target address from tape library 102, which may have received the address from a networked client computer such as client computer 120. In one embodiment, abstract application 112 commands tape drive controller 106 to command head servo 110 to reposition drive head 108 such that drive head 108 can perform data processing operations on the data band of the magnetic tape of tape cartridge 114 identified to possess the highest signal amplitude. In another embodiment, abstract application 112 commands tape drive controller 106 to command head servo 110 to reposition drive head 108 such that drive head 108 can perform data processing operations on the data band of the magnetic tape of tape cartridge 114 identified to not possess the lowest signal amplitude. Performing seek operations on the data band with the highest signal amplitude will introduce abrasive wear to sections of drive head 108 that are the least worn to the current operation. Avoiding performing seek operations on the data band with the lowest signal amplitude will avoid introducing unnecessary abrasive wear to sections of drive head 108 that are the most worn to the current operation.

Abrasion program 112 instructs a tape drive to read position information until reaching a target position (212). In one embodiment, abrasion program 112 reads servo information from tape drive controller 106 until reaching a target address on tape cartridge 114. In one embodiment, abrasion program 112 requests which address most recently moved past drive head 108 from tape drive controller 106, comparing the requested value against the target address until the two values are equal. In another embodiment, abrasion program 112 requests which address most recently moved past drive head 108 from tape drive controller 106, comparing the requested value against the targeted address until the requested value is nearly equal to the targeted address. In another embodiment, abrasion program 112 requests servo information including the current longitudinal position of the tape from tape drive controller 106, comparing the requested value against the value for the targeted address until the two values are equal.

Abrasion program 112 instructs a tape drive to position a drive head for a data processing operation (214). In one embodiment, where tape cartridge 114 has a plurality of data bands numbered 0 . . . n, abrasion program 112 instructs a tape drive to position a drive head on a data band for a data processing operation. In one embodiment, abrasion program 112 instructs tape drive controller 106 to move drive head 108 in the transverse direction for data processing on the data band targeted for data processing. In one embodiment, abrasion program 112 instructs tape drive controller 106 to command head servo 110 to position drive head 108 for data processing operations on the data band of tape cartridge 114 that possesses the targeted address. For example, where data band 0 has the lowest signal amplitude and data bands 1 through 3 have the highest signal amplitude, and abrasion program 112 received a data processing operation for a block of data on track 0, abrasion program 112 may have previously selected data band 1 for seeking to the longitudinal position of the block, switching back to data band 0 when reaching the desired longitudinal position.

Figure 3:
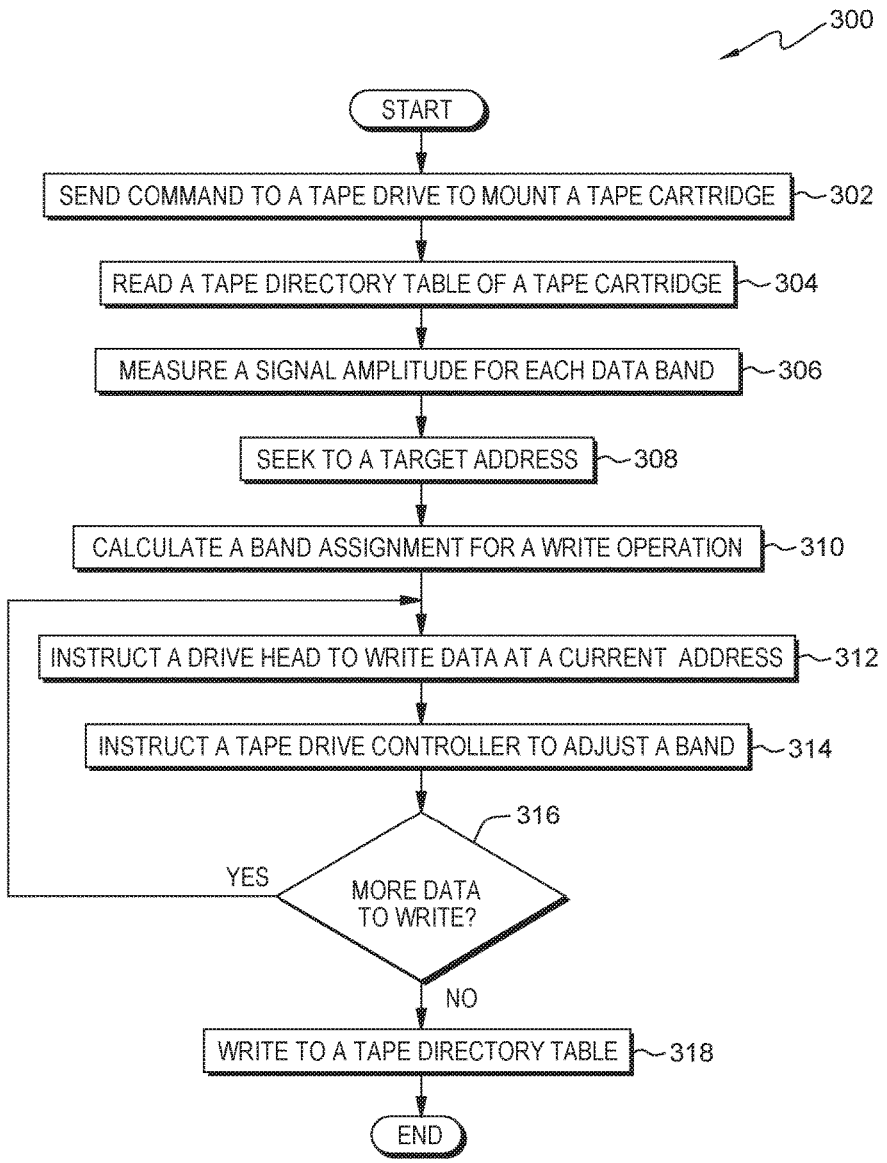
FIG. 3 is a flowchart depicting operational steps of an abrasion program for evenly distributing wear on the surface of a tape drive head during write processes, in accordance with an embodiment of the present invention.

FIG. 3 depicts a flowchart of operational steps of an anti-abrasion program, such as abrasion program 112 of FIG. 1, generally designated 300, for distributing surface abrasion across magnetic tape read/write drive heads, such as drive head 108 of FIG. 1, during write operations based upon measurements of current levels of abrasion at one or more positions on a magnetic tape read/write drive head in accordance with an embodiment of the present invention.

Abrasion program 112 commands a tape drive to mount a tape cartridge (302). In one embodiment, abrasion program 112 commands tape drive 104 to mount and calibrate tape cartridge 114 and drive head 108 for data processing. In one embodiment, responsive to receiving tape cartridge 114 from tape library 102 and a request from tape library 102 for a data processing operation on tape cartridge 114, abrasion program 112 instructs tape drive controller 106 to position tape cartridge 114 for read/write operations by drive head 108. For example, abrasion program 112 may instruct tape drive controller 106 to operate motors within tape drive 104 to move tape cartridge 114 into operational coupling with a spindle such that the magnetic tape within tape cartridge 114 may rotate to facilitate longitudinal movement of the magnetic tape across drive head 108.

Abrasion program 112 reads a tape directory table of a tape cartridge (304). In one embodiment, abrasion program 112 reads a tape directory table of tape cartridge 114 for the address and track (note: the terms "track" and "band" are used interchangeably herein) of an appropriate sized unused block on tape cartridge 114. In one embodiment, tape cartridge 114 includes a tape directory table which nonexclusively includes a data set ID number and a physical track number that defines the location of the data set on the magnetic tape of the tape cartridge. In one embodiment, abrasion program 112 reads the location of available data segments from the tape directory table of tape cartridge 114. In another embodiment, abrasion program 112 reads from the tape directory table of tape cartridge 114 the location of the first available data segment of each data band of tape cartridge 114. For example, abrasion program 112 may read the tape directory table of tape cartridge 114 and find that there is an available segment beginning at 1000 on track 0, an available segment beginning at 500 on track 1, an available segment beginning at 200 on track 2, and an available segment beginning at 0 on track 3.

Abrasion program 112 measures a signal amplitude for each data band (306). In one embodiment, abrasion program 112 requests from tape drive controller 106 the signal amplitudes for each of the data bands of tape cartridge 114 and selects a data band of tape cartridge 114 for a write operation. In one embodiment, abrasion program 112 requests the signal amplitude for each data band of tape cartridge 114 and selects the data band of tape cartridge 114 with the highest signal amplitude for use in the write operation. For example, tape cartridge 114 includes four data bands numbered 0 through 1 with each data band having available data segments to accommodate the current write operation, abrasion program 112 reads the signal amplitudes of tracks 0 through 3 and elects to write to track 3 because it has the highest signal amplitude. Signal amplitude is a parameter for the strength of a data processing connection between the magnetic tape of tape cartridge 114 and drive head 108, defined by magnetic tape material and wear condition of drive head 108 such as increased distance between magnetic tape and drive head 108 or an uneven surface on drive head 108.

Abrasion program 112 seeks to a target address (308). In one embodiment, abrasion program 112 instructs tape drive controller 106 to seek to a target address for a write operation. In one embodiment, abrasion program 112 instructs tape drive controller 106 to perform a seek operation to the longitudinal component of a targeted address on tape cartridge 114, with drive head 108 positioned for data processing operations on a data band of tape cartridge 114 based upon the value of the signal amplitudes of each of the data bands. In one embodiment, abrasion program 112 instructs tape drive controller 106 to begin a seek operation to the longitudinal component of a targeted address on tape cartridge 114, with drive head 108 positioned for data processing operations on a data band of tape cartridge 114 with the highest signal amplitude. In one embodiment, abrasion program 112 receives the target address from a tape library, such as tape library 102. In another embodiment, abrasion program 112 receives the target address from a client computer, transmitted to abrasion program 112 across network 118, tape library 102, and tape drive 104.

Abrasion program 112 calculates band assignment for write operation (310). In one embodiment, data bands specific transverse positions for the position of head servo 110 that include an associated band of data receptive material on the magnetic tape of tape cartridge 114. In one embodiment, abrasion program 112 calculates how many segments of the band of the selected data band abrasion program 112 requires to fulfill the write operation. For example, where the write operation might require 40 megabytes of data storage and tape cartridge has data segments of 1.5 megabytes, abrasion program 112 calculates the current write operation requirement of 27 segments.

Abrasion program 112 instructs a drive head to write data at a current address (312). In one embodiment, abrasion program 112 instructs tape drive controller 106 to write data at the current address. In one embodiment, abrasion program 112 instructs drive head 108 to write data beginning at the address of the current segment of current data band of tape cartridge 114. For example, where the current write operation requires 27 segments to complete and abrasion program 112 has already selected segments 20 through 47 of track 1 for the write operation, abrasion program 112 instructs drive head 108 to fill segment 20 to capacity with data from the write operation starting at the beginning address of segment 20.

Abrasion program 112 instructs a tape drive controller to adjust a band (314). Abrasion program 112 instructs tape drive controller 106 to adjust the band to the next address. In one embodiment, abrasion program 112 instructs tape drive controller 106 to spool tape cartridge 114 to the next available segment for data processing. For example, where the last segment used for the write operation was not located at the end of the magnetic tape of tape cartridge 114, abrasion program 112 instructs tape drive controller 106 to spool tape cartridge 114 to the next segment on the current data band. In another example, where the last segment used was located at one end of the magnetic tape, abrasion program 112 does not instruct tape drive controller 106 spool the magnetic tape of tape cartridge 114 as the next segment would be located on the same data band in the opposite direction.

Abrasion program 112 determines whether there is more data to write (316). In one embodiment, abrasion program 112 determines whether there is more data to write for the write operation. In one embodiment, where abrasion program 112 completed filling a segment with data from the write operation, abrasion program 112 compares whether the previously filled segment is congruent with the final segment of the calculated band assignment.

Responsive to a determination that there is more data to write (YES branch, 316), abrasion program 112 continues to instruct a drive head to write data at a current address (312).

Responsive to a determination that there is no more data to write (NO branch, 316), abrasion program 112 writes to a tape directory table (312). In one embodiment, abrasion program 112 updates tape directory table to include the location information of the data of the current write operation on tape cartridge 114. In one embodiment, abrasion program 112 updates the tape directory table to include a column for the physical track of the current data operation and inputs the data band of the current data operation. For example, abrasion program 112 might update the tape directory table to reflect a first data set written on data band twelve and a ninth data set written on data band six.

Figure 5:
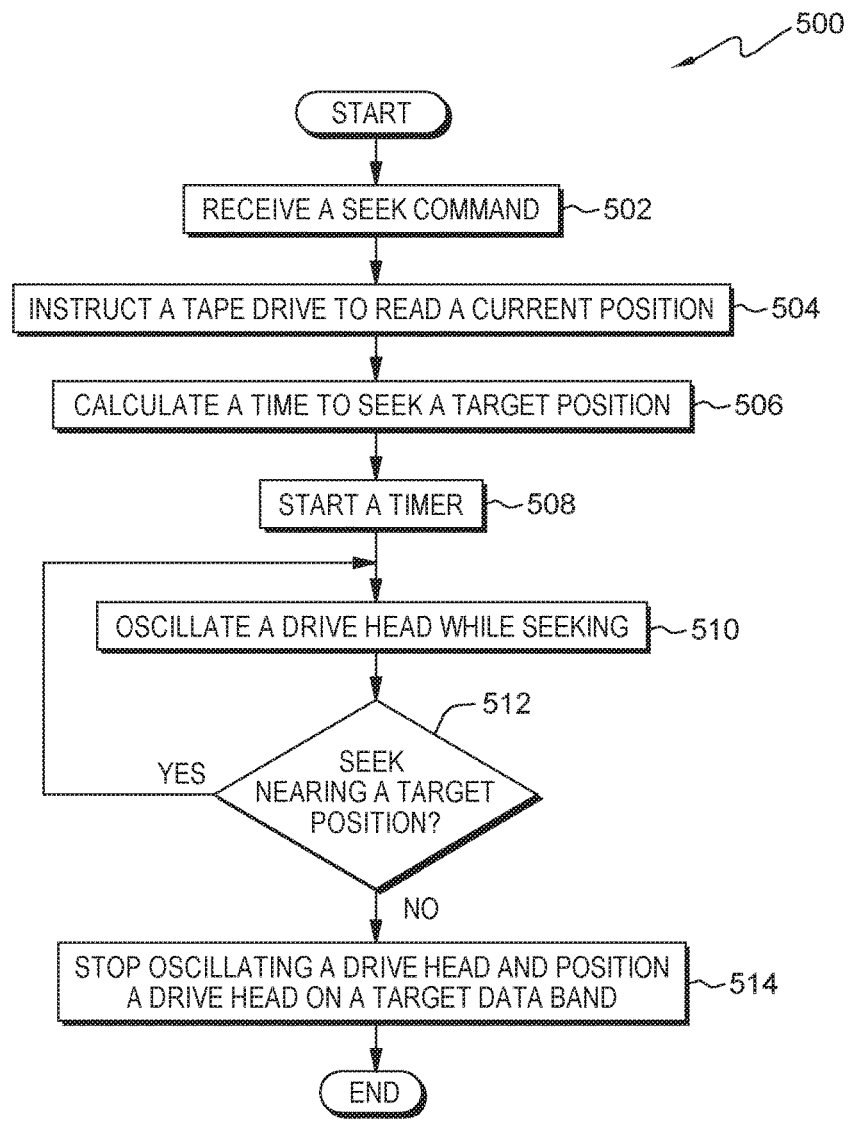
FIG. 5 is a flowchart depicting operational steps of an abrasion program for oscillating a tape drive head to distribute wear during a seek process, in accordance with an embodiment of the present invention.

FIG. 5 depicts a flowchart of operational steps of an anti-abrasion program, such as abrasion program 112 of FIG. 1, generally designated 500, for distributing surface abrasion across magnetic tape read/write drive heads, such as drive head 108 of FIG. 1, during seek operations through oscillating drive head 108 in the transverse direction relative to the motion of the magnetic tape of tape cartridge 114 as it spools past drive head 108.

Abrasion program 112 receives a seek command (502). In one embodiment, a seek command is a component of a data processing operation. In one embodiment, abrasion program 112 receives a seek command from tape drive controller 106 for a target address on the magnetic tape of tape library 102, the targeted address including a specified data band and longitudinal address. In one embodiment, a data processing operation is a request to read data stored on a tape cartridge of tape library 102 or to write data to a tape cartridge of tape library 102. In one embodiment, abrasion program 112 receives a data processing operation from client computer 120 through a connection that includes network 118, tape library 102, and tape drive 104.

Abrasion program 112 instructs a tape drive to read a current position on a tape cartridge (504). In one embodiment, abrasion program 112 reads a current position of a tape cartridge currently mounted to a tape drive. In one embodiment, abrasion program 112 reads the current position of the tape cartridge, such as tape cartridge 114, by reading the current data band and longitudinal address of the magnetic tape of tape cartridge 114. For example, where tape cartridge 114 is newly mounted to the tape drive, such as tape drive 104, abrasion program 112 reads a current position of data band 0 address 0. In one embodiment, a current position is a longitudinal address on the magnetic tape of a tape cartridge, such as tape cartridge 114, that is presently located in read/write position with a tape drive head, such as drive head 108.

Abrasion program calculates a time to seek a target position (506). In one embodiment, abrasion program 112 calculates a time to seek to a target position of the current data processing operation and sets a timer for the calculated duration of time. In one embodiment, abrasion program 112 calculates the time required to reach a target longitudinal address from the current longitudinal address by comparing the distance in meters of tape between the two addresses and the speed that the spools of tape drive 104 can spool the magnetic tape of tape cartridge 114. Abrasion program 112 uses the calculated time to create a timer variable. For example, where the current longitudinal address of the magnetic tape of tape cartridge 114 is 0, the targeted longitudinal address of tape cartridge 114 is 100, each longitudinal address includes one meter of tape, and tape drive 104 can spool at a rate of one meter per second, abrasion program 112 calculates that it will take 100 seconds to reach the targeted position and creates a timer equal to 100 seconds. In another embodiment, abrasion program 112 calculates the time to be equal to the time required to reach a target longitudinal position on the magnetic tape of tape cartridge 114 from a current longitudinal position on the magnetic tape of tape cartridge 114 minus a percentage of the calculated time. For example, where the calculated time is 100 seconds, abrasion program 112 subtracts 10% from the calculated time, resulting in a new calculated time of 90 seconds. In another embodiment, abrasion program 112 stores the calculated time to seek in the local memory of tape drive controller 106.

Abrasion program 112 starts a timer (508). In one embodiment, abrasion program 112 begins a timer previously calculated to represent the time required to reach a target longitudinal position on the magnetic tape of tape cartridge 114 from a current longitudinal position on the magnetic tape of tape cartridge 114. In another embodiment, abrasion program 112 starts a timer initialized to a value of 0.

Abrasion program 112 oscillates a drive head while seeking (510). In one embodiment, abrasion program 112 seeks to a target address for data processing while oscillating drive head 108 transverse to the direction of spooling of the magnetic tape of tape cartridge 114. In one embodiment, abrasion program 112 instructs tape drive controller 106 to spool the magnetic tape of tape cartridge 114 in the longitudinal direction towards a target address and abrasion program 112 instructs tape drive controller 106 to operate head servo 110 to move drive head 108 transverse to the motion of the magnetic tape of tape cartridge 114. In one embodiment, abrasion program 112 instructs tape drive controller 106 to operate head servo 110 while performing a seek operation to move drive head 108 transverse to the motion of the magnetic tape of tape cartridge 114 such that drive head 108 sequentially moves into read/write position over each data band of the magnetic tape of tape cartridge 114 until reaching the last data band where abrasion program 112 instructs tape drive controller 106 to operate head servo 110 to follow a reverse sequence until reaching the initial data band (a transverse oscillation). In another embodiment, abrasion program 112 reads a signal amplitude for each data band of the magnetic tape of tape cartridge 114 and excludes positioning drive head 108 from read/write position on the data band with the lowest signal amplitude during transverse oscillation. For example, where data band 0 is the initial data band, there are 4 data bands numbered 0 through 3, and data band 0 has the lowest signal amplitude, abrasion program 112 limits transverse oscillation to data bands 1 through 3, excluding 0 such that while transverse oscillation occurs during seek operations drive head 108 is not in read/write position for data band 0.

Abrasion program 112 determines if the seek is nearing a target position (512). In one embodiment, abrasion program 112 determines whether a timer indicates that the target address for data processing is near read/write position. In one embodiment, abrasion program 112 determines whether the timer indicates that a target address on the magnetic tape of tape cartridge 114 is near read/write position with drive head 108 by checking if the timer has reached 0. In another embodiment, abrasion program 112 determines whether the target position is nearing read/write position by comparing the amount the timer has currently counted to against the calculated time to seek to target position. In another embodiment, abrasion program 112 determines whether the target position is nearing read/write position by comparing the amount the timer has currently counted to against a percentage of the calculated time to seek to target position. For example, where the target position is near read/write position when 90% of the time to seek to target position has elapsed, abrasion program 112 compares the amount the timer has currently counted to against the calculated time to seek to target position multiplied by 0.9.

Responsive to a determination that a seek operation is not nearing a target position (NO branch, 512), abrasion program 112 continues to oscillate a drive head while seeking (510). In one embodiment, responsive to a determination that the timer does not indicate that the targeted address for data processing is near read/write position (NO branch, 512) abrasion program 112 continues seeking to the target position and oscillating drive head 108.

Responsive to a determination that a seek operation is nearing a target position (YES branch, 512), abrasion program 112 stops oscillating a drive head and positions the drive head on a target data band (514). In one embodiment, responsive to a determination that the targeted address for data processing is near read/write position (YES branch, 512) abrasion program 112 stops oscillating drive head 108 and instructs tape drive controller 106 to move drive head 108 onto the data band for the targeted data processing operation (518). In one embodiment, abrasion program 112 ceases transverse oscillation of drive head 108 and instructs head servo 110 to position drive head 108 into read/write position on the data band of the data processing operation on the magnetic tape of tape cartridge 114. In one embodiment, abrasion program 112 continues the remainder of the seek operation on the data band of the data processing operation after transverse oscillation has ceased. For example, where abrasion program 112 determines that transverse oscillation should cease when 90% or more of the time to seek to target position has elapsed, 91% of the time to seek target position has elapsed, the target of the data processing operation is on data band 0, abrasion program 112 has ceased transverse oscillation when drive head 108 is positioned over data band 3, abrasion program 112 instructs head servo 110 to position drive head 108 in read/write position for data processing on data band 0 for the remaining 9% of the seek operation.

Figure 6:
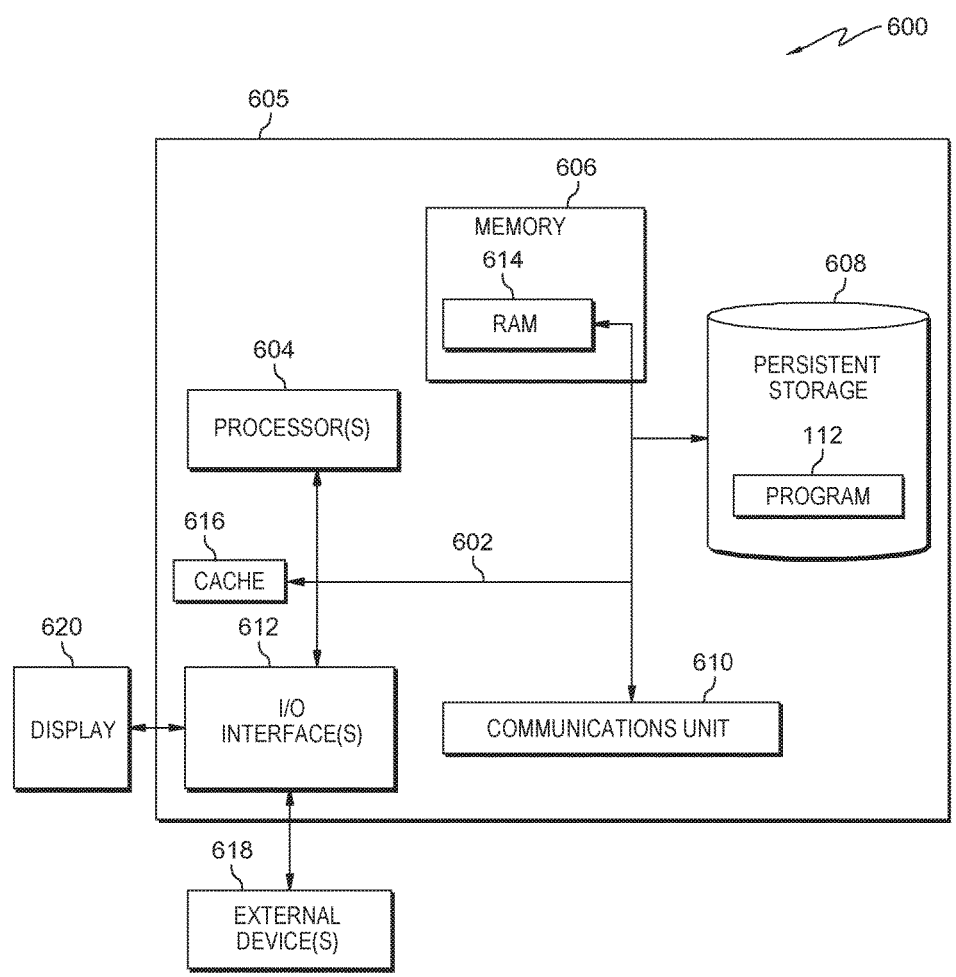
FIG. 6 is a block diagram illustrating a data processing system in accordance with an embodiment of the present invention.

FIG. 6 depicts a block diagram of components of data processing system, such as tape drive controller 106 of FIG. 1, library controller 116 of FIG. 1, and client computer 120 of FIG. 1, generally designated 600, in accordance with an illustrative embodiment of the present invention. It should be appreciated that FIG. 6 provides only an illustration of one implementation and does not imply any limitations with regard to the environments in that different embodiments may be implemented. Many modifications to the depicted environment may be made.

In the illustrative embodiment, client computer 120 in data processing environment 100 is shown in the form of a general-purpose computing device, such as computer system 605. The components of computer system 605 may include, but are not limited to, one or more processors or processing unit(s) 604, memory 606, and bus 602 that couples various system components including memory 606 to processing unit(s) 604.

Bus 602 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 605 typically includes a variety of computer system readable media. Such media may be any available media that is accessible by computer system 605 and it includes both volatile and non-volatile media, removable and non-removable media.

Memory 606 can include computer system readable media in the form of volatile memory, such as random access memory (RAM) 614 and/or cache memory 616. Computer system 605 may further include other removable/non-removable, volatile/non-volatile computer system storage media. By way of example only, storage system 608 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 602 by one or more data media interfaces. As will be further depicted and described below, memory 606 and/or persistent storage 608 may include at least one computer program product having a set (e.g., at least one) of program modules that are configured to carry out the functions of embodiments of the invention.

Program 112, having one or more sets of program modules, may be stored in memory 606 and/or persistent storage 608 by way of example and not limitation, as well as an operating system, one or more application programs, other program modules and program data. Each of the operating systems, one or more application programs, other program modules and program data or some combination thereof, may include an implementation of a networking environment. Program 112 generally carries out the functions and/or methodologies of embodiments of the invention as described herein. Computer system 605 may also communicate with one or more external device(s) 618, such as a keyboard, a pointing device, a display 620, etc. or one or more devices that enable a user to interact with computer system 605 and any devices (e.g., network card, modem, etc.) that enable computer system 605 to communicate with one or more other computing devices. Such communication can occur via Input/Output (I/O) interface(s) 612. Still yet, computer system 605 can communicate with one or more networks, such as a local area network (LAN), a general wide area network (WAN) and/or a public network (e.g., the Internet) via communications unit 610. As depicted, communications unit 610 communicates with the other components of computer system 605 via bus 602. It should be understood that although not shown, other hardware and software components, such as microcode, device drivers, redundant processing units, external disk drive arrays, RAID systems, tape drives and data archival storage systems may be used in conjunction with computer system 605.

Figure 7:
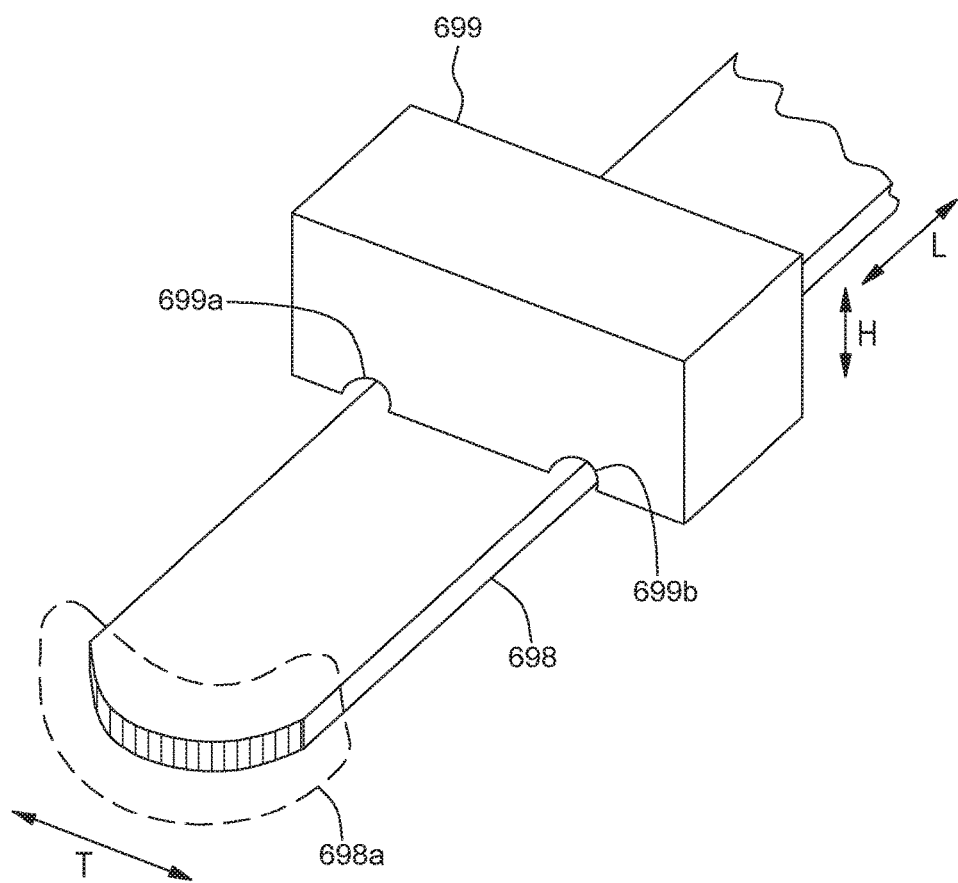
FIG. 7 is a perspective view of a portion of an embodiment of a tape drive system and tape that illustrates a common head wear pattern.

A few comments about typical head wear patterns will now be made with reference to FIG. 7, which shows magnetic head 699 (including read/write head, not separately shown, and a head mounting, also not separately shown); and magnetic tape 698. In operation, tape 698 extensively moves in longitudinal direction L with respect to head 699. In some embodiments, the tape will tend to take on U-shaped profile 698 in a cross section taken in the height-transverse (H-T) plane. Because of this, the transverse edges of the tape will tend to wear a pair of recesses 699a and 699b in the material of the head mounting portion of the head. This can lead to fairly complex wear profiles in embodiments where the head and tape can be transversely adjusted in position relative to each other and/or where there are multiple read/write heads in a single block of head mounting material. It is noted that some of the embodiments discussed below assume a simpler wear pattern, where the entire transverse run of the tape abrades the head uniformly. This simplification is done largely for simplicity of illustration and understanding purposes. However, it should be kept in mind that the techniques can be adjusted, within the scope of the present invention and as will be understood by those of skill in the art, to work in the context of embodiments where the abrasion patterns are similar to what is shown in FIG. 7.

Figure 8:
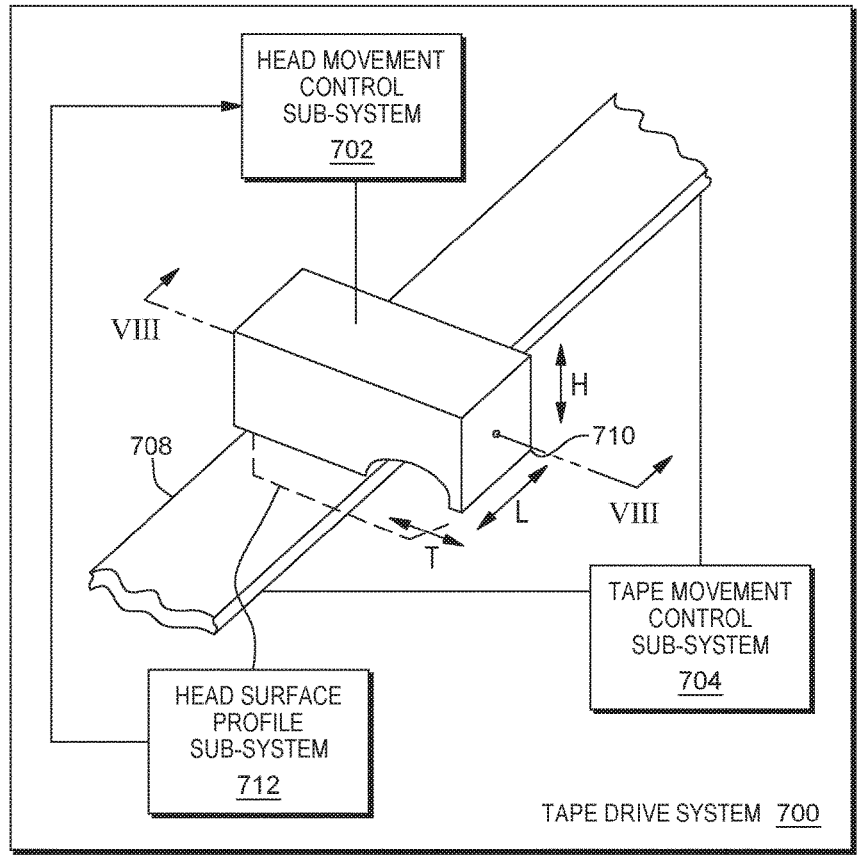
FIG. 8 is a part perspective/part schematic view of a tape drive system according to the present invention.
Figure 9:
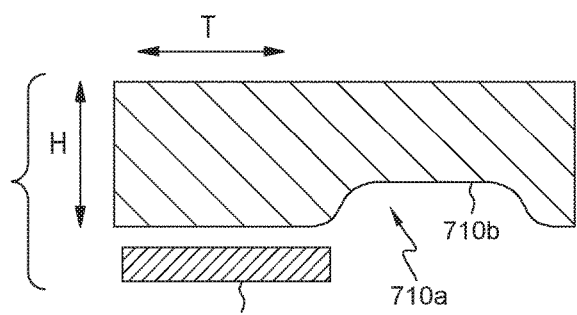
FIG. 9 is a cross-sectional view of a portion of the tape drive system of FIG. 8.

As shown in FIGS. 8 and 9, tape drive system 700 include: head movement control sub-system 702; tape movement control sub-system 704; magnetic tape 708 (which defines a height direction H, a longitudinal direction L and a transverse direction T); magnetic tape head 710 (including tape facing surface 710a and recess 710b); and head surface profile sub-system 712.

Tape movement control sub-system 704 is structured, connected and or programmed to control the movement of tape 708. In this embodiment, sub-system 704 includes feed guide hardware (not separately shown), a rotationally driven feed reel (not separately shown) and a rotationally driven take up reel (not separately shown). More specifically, in this embodiment, tape 708 only moves, relative to the whole of tape drive system 700, in the longitudinal direction L, so this is the only movement controlled by sub-system controlled by sub-system 702. Alternatively, in some embodiments the tape may move in additional directions(s) and/or rotate, and these motions would also be controlled by sub-system 704.

Head movement control sub-system 702 is structured, connected and or programmed to control the movement of head 710. More specifically, in this embodiment, head 710 only moves relative to tape 708 in the transverse direction T, so this is the only movement controlled by sub-system controlled by sub-system 702. Alternatively, in some embodiments the head may move in additional directions(s) and/or rotate, and these motions would also be controlled by sub-system 702.

Head surface profile sub-system 712 is structured, connected and/or programmed to determine a wear profile of tape facing surface 710a of head 710. In this embodiment: (i) the wear profile is provided to sub-system 712 by a user (not shown) manually entering data obtained by measurement equipment external to tape drive system 700; (ii) the wear profile is essentially one dimensional (that is wear depth at various transverse direction positions along tape facing surface 710a without accounting for wear variations along longitudinal direction L); and (iii) the wear profile indicates that surface 710 includes recess 710b where tapes have worn a groove in head 710. Alternatively, the wear profile may be provided to sub-system 712 in other ways, such as by keeping track of distance and/or relative velocity of relative motion between the head and tape(s) for various transverse positions of the head. As a further alternative, the wear profile may be two dimensional (for example, transverse and longitudinal directions, or, for a curved tape facing surface, circumferential and angular directions).

As shown in FIG. 8, sub-system 712 sends the wear profile data to sub-system 702, and sub-system 702 controls motion of head 710, relative to tape 708 to counter the wear. More specifically, in this example, that means that sub-system 702 moves head 710 in the transverse direction T so that it is away from recess 710b. In this way, any further abrasion caused by tape 708 will tend to make the wear profile more flat and planar. As will be appreciated by those of skill in the art, in embodiments with curved tape facing surfaces, the wear profile would counter wear by restoring the curve(s) that the tape facing surface had when it was new and unworn. While this embodiment moves the tape head, relative to the tape, to counter wear in a single linear direction (that is, transverse direction T), other embodiments may move the tape and head relatively in additional and or different directions (for example, curved directions, rotational directions). In this embodiment, only the tape head is adjusted in its position to counter wear. Alternatively, the tape movement control sub-system may move the position of the tape to adjust the relative positions of the head and tape in a manner that counters wear determined from the wear profile data. As a further alternative, some embodiments may adjust positions of both the head and the tape.

In the embodiment of FIGS. 8 and 9, the transverse direction adjustment to counter wear occurs only during some operations, but not others. More specifically, this adjustment occurs during: (i) fast forward type operations (where no reading or writing occurs); (ii) rewind type operations (where no reading or writing occurs); and (iii) some write operations (specifically those where there are no constraints on which longitudinal track on the tape is going to store the data being written by the write operation). This adjustment does not occur during read operations because the transverse position of the head is constrained by the location of the longitudinal track(s) of the tape from which data is being red by the read operation.

In conclusion with respect to the discussion of the embodiment of FIGS. 8 and 9, it is noted that a gap, in height direction H, is shown between the tape facing surface of the magnetic head and the head facing surface of the magnetic tape. However, it will be understood by those of skill in the art that: (i) FIGS. 8 and 9 are not necessarily drawn to scale; and (ii) the magnetic head and magnetic tape will be close enough to be in spatially and/or temporally intermittent contact such that longitudinal direction relative movement between the tape and head will cause abrasion over time. Also, in many embodiments the wear patterns, which are counteracted by transverse relative positional adjustment between the head and tape, will be more like those discussed above in connection with FIG. 7.

Figure 10:
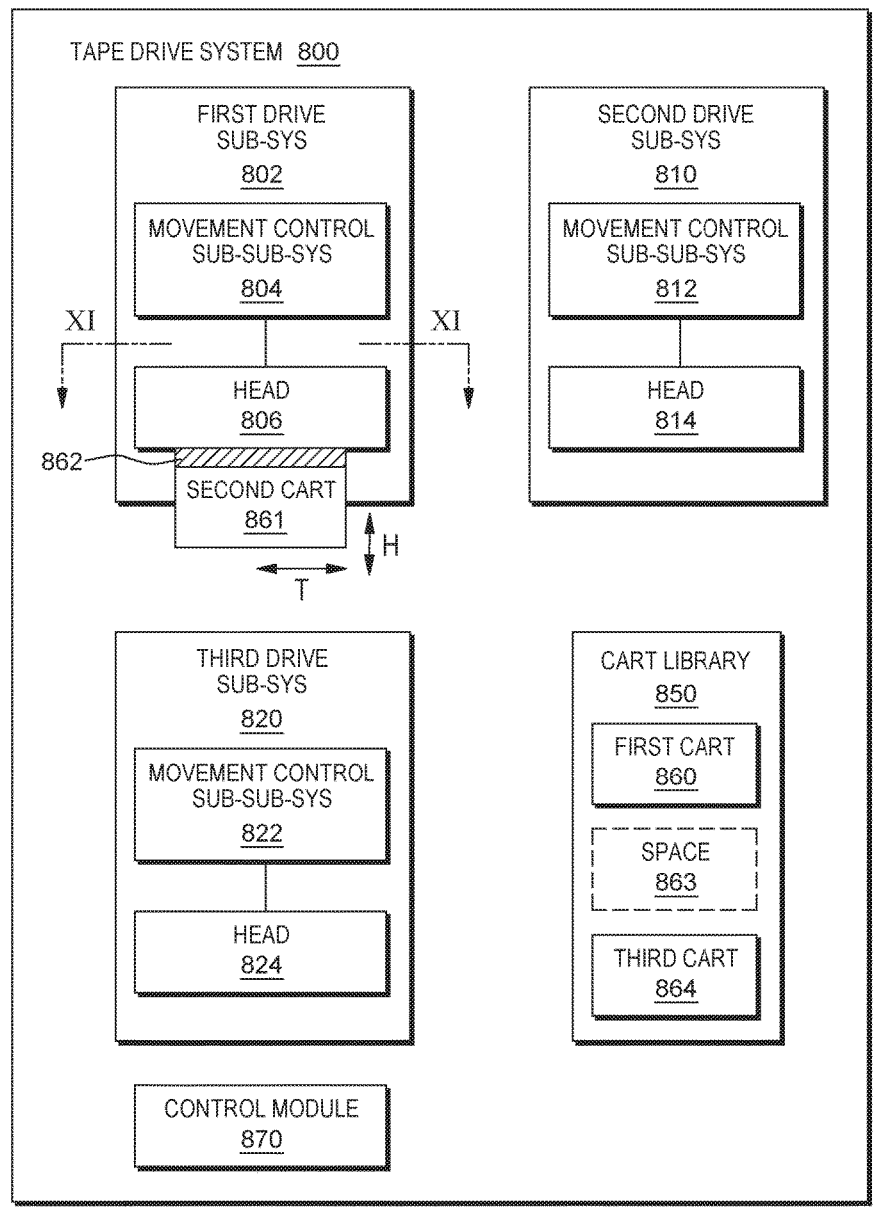
FIG. 10 is a schematic view of an embodiment of a tape drive system.
Figure 11A:
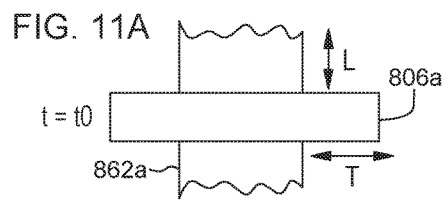
FIGS. 11A to 11I show relative positions of parts of the system of FIG. 10 at successive points in time.
Figure 11F:
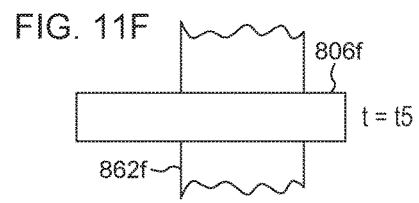
Figure 11B:
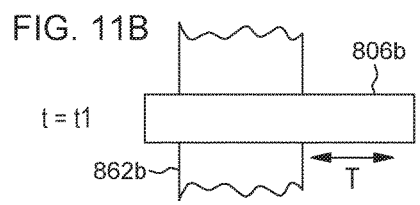
Figure 11G:
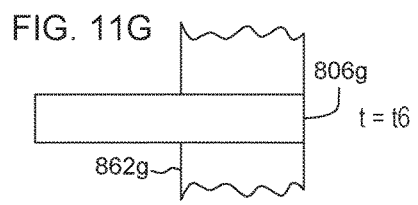
Figure 11C:
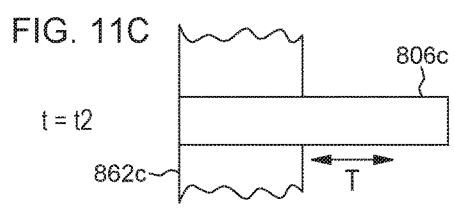
Figure 11H:
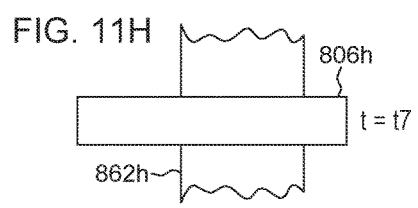
Figure 11D:
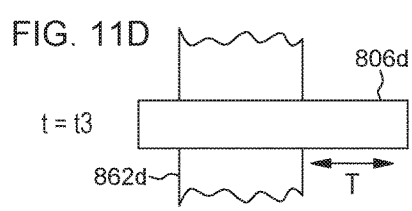
Figure 11I:
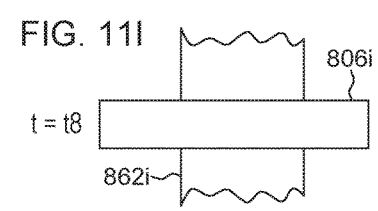
Figure 11E:
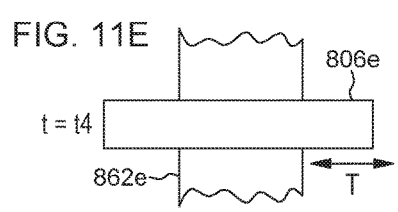

FIGS. 10 to 11I show tape drive system 800 including: first tape drive sub-system 802 (including movement control sub-sub-system (MCSS) 804 and head 806); second tape drive sub-system 810 (including MCSS 812 and head 814); third tape drive sub-system 820 (including MCSS 822 and head 824); cartridge library 850 (including first cart 860, empty space 863 for second cart, and third cart 864); second cart 861 (including tape 862); and control module 870.

In the embodiment of FIGS. 10 to 11I, the head moves in an oscillating fashion in the transverse direction T during seek operations as shown by comparing FIGS. 11A to 11I to each other. More specifically, FIGS. 11A to 11I show, for nine successive points in time t0 to t8, the respectively corresponding transverse positions 806a to 806i relative to tape (respectively tape positions 862a to 862i). Although not well shown by the drawings, it should be understood that tape 862 is moving in longitudinal direction L relative to head 806 because a seek operation is being performed during the time interval from t0 to t8. In this embodiment, tape 862 remains at a constant transverse position relative to first drive sub-system 802 considered as a unit. Alternatively, tape 862 could be moved in transverse direction T in order to effect the oscillating relative transverse movement between the head and the tape that is shown by FIGS. 11A to 11I.

Control module 870 controls tape drive system 800 as a whole, including instructing the oscillating transverse relative motion shown by FIGS. 11A to 11I. Control module 870 may include a computer, a processor set, memory, data storage and machine logic (for example, hardware, software and/or firmware). Alternatively, machine logic control of the oscillation could be effected, in whole or in part, locally with respect to first dive sub-system 802 at MCSS 804.

In this embodiment, the oscillation movement has a constant period from oscillation cycle to cycle (FIGS. 11A to 11I show one cycle). Alternatively, there could be a variable period depending upon factors such as relative tape speed in the L direction.

In this embodiment, the pattern of oscillation is sinusoidal. Alternatively, it could follow other patterns, such as sawtooth or asymmetric sinusoidal patterns.

In this embodiment, the amplitude of the relative transverse oscillation is constant and ranges: (i) from a leftmost position where the right edges of the head and tape are aligned (see FIG. 11G); (ii) to a rightmost position where the left edges of the head and tape are aligned (see FIG. 11C). Alternatively, non-constant amplitudes from cycle to cycle are possible. As a further alternative, different ranges of relative transverse motion are possible, such as motion ranges designed to compensate for asymmetrical wear patterns observed, and/or predicted by usage patterns, on the head.

Some embodiments of the present invention may include one, or more, of the following features, characteristics, operations and/or advantages: (i) protect magnetic tape drive read/write heads against unequal abrasion; (ii) significant increase of the lifetime of the magnetic head; (iii) avoiding damages to the tapes; (iii) applicable to tape drives having 32 (or more or fewer) write/read heads for writing and reading data from/to the tape; (iv) data is arranged into tracks and data bands (0 . . . 3 by LTO); (iv) data read/written into both tape move directions—forward and backward; (v) to "keep on track," the read/write heads have dedicated servo heads on the top and bottom to read the vertical position; (vi) by reading content from the tape, the drive has to seek to the related LPOS (longitudinal position) where the data resides; (vii) from a statistical point of view, for every read operation, the media has to be fast-forwarded by 50% of the length of the media (seek operation); (viii) to achieve quick data access time the speed of the tape during the seek operation is much faster as during reading of the data; (ix) the speed of the tape has a significant influence on the amount of abrasion; and/or (x) as tape speed increases, abrasion increases.

Some embodiments of the present invention may include one, or more, of the following features, characteristics, operations and/or advantages: (i) the tape itself is very thin and not exactly flat when it flies with high speeds over the head and the head mounting; (ii) the tape edges slightly go down and form a kind of ellipse; (iii) over the time and usage, the described edges causing abrasions at the "head mounting," which degenerates the head mounting and can damage tapes; and/or (iv) depending on the tape usage and the data pattern this behavior can be more or less intensive (for example if just smaller files are read independently from each other the drive is spooling most of the time to the related LPOS).

Some embodiments of the present invention may include one, or more, of the following features, characteristics, operations and/or advantages: (i) a method leading to an equal distribution of the abrasion and, typically, a significant increase of the lifetime of the magnetic head; (ii) damages to the tapes as grooves are avoided; (iii) grooves are avoided and therefore, typically, read/write quality is extended; (iv) exchangeability of tape media to different drives is improved; (v) tape media damages by grooves are avoided and therefore life time of the media is extended; (vi) maintenance due to data loss or drive or media replacement is reduced; and/or (vii) significantly extended life time of the tape drive.

Some embodiments of the present invention may include one, or more, of the following features, characteristics, operations and/or advantages: (i) changes the "unequal" abrasion into a abrasion that is uniform in the aggregate considered over time and use; (ii) like the car wheel ruts on the road, which are created because all cars have to drive on the same lane, some embodiments move the head mounting—and therefore the magnetic head—up and down (Y-direction) during seek operations; and/or (iii) for the movement in Y-direction the entire width of the head mounting can be utilized so that the abrasion get spread about the maximum area—this way the edges of the tape itself smooth down the MR head and the head mounting equally and ruts are avoided.

Some embodiments of the present invention may include one, or more, of the following features, characteristics, operations and/or advantages: (i) the servo track information can be read for all Y-positions (at least within regular time periods) so that the drive does not lose track and it always can be determined at which LPOS of the tape the head is currently positioned; (ii) shortly before achieving a dedicated LPOS for reading/writing, the head will be steered to the target track/band—this means the movement in Y-direction stops; (iii) abrasion caused during read operation will be statically smoothened during another seek operation.

Some embodiments of the present invention may include one, or more, of the following features, characteristics, operations and/or advantages: (i) reduces and/or delays situations where a zone of a recording head, corresponding to a single track, with relatively deep abrasion makes the complete head unusable and therefore the drive needs to be exchanged; (ii) implementation on drive level using an additional application which operates as follows: (a) an application determines based on the signal amplitudes during reading from the tape which of the n (n=4) tracks of the tape is used most and already has the biggest abrasion (grooves), (b) the application determines than which track should be used next to spread the abrasion equally over all n tracks; (iii) implementation on drive level using the read/write head as follows: (a) the drive determines the abrasion level using the read amplitude during the calibration process, and (b) based on this determination the drive decides on which track of the tape the data will be written to; and/or (iv) implementation on tape library level as follows: (a) an application determines based on the statistical fill rate of the tape cartridges and the use of each of the system's drives, (b) based on the fill rates and drive use, the probability of abrasion on the magnetic head on specific tracks is determined, and (c) optimizes the assignment of tapes to drives for future read/write requests in a way that the abrasion is equally distributed over all tracks and all drives of the library.

Some embodiments of the present invention may include one, or more, of the following features, characteristics, operations and/or advantages: (i) maintenance due to data loss or drive or media replacement is reduced; (ii) the head can move into different Y positions for track reading while tape is moved in X-direction to locate the servo tracks within the band-area; (iii) the servo-tracks provide the encoded x-position and provide the information onto which data-track the head is currently positioned in Y-Direction; (iv) mechanically the head is moved by using the state of the art calibration mechanism; (v) based on the recording speed and the average diameter of the ribbon coil, the spooling time and the time of the oscillation in +/−Y direction is calculated; and/or (vi) some embodiments are characterized by a schematical architecture of a tape where: (a) every band is bordered by servo tracks, and (b) there are two different kinds of servo tracks (whereas LTO technology uses a Timing-Based-Pattern A. B shows an Amplitude-Based-Pattern.

Figure 4:
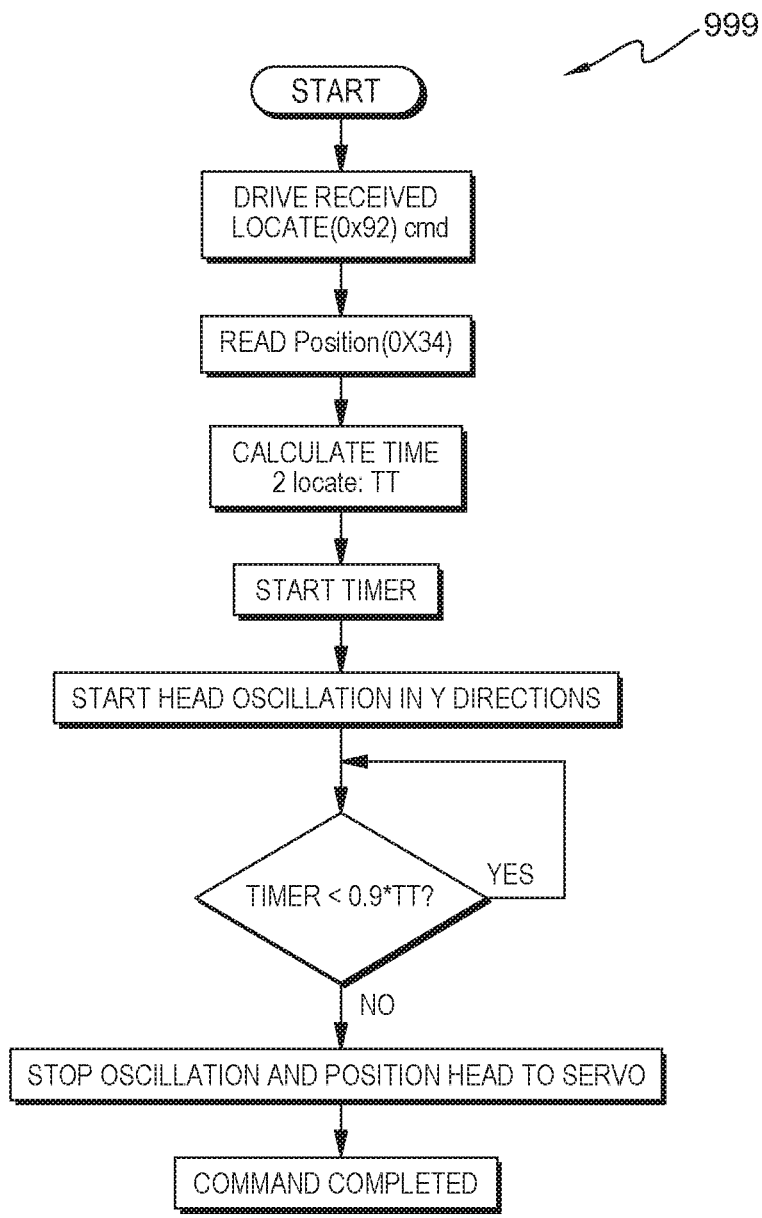
FIG. 4 is a flowchart showing a method according to an embodiment of the present invention.

FIG. 4 shows flowchart 999, which is an embodiment of a method of seeking to target, and which will now be explained in the following paragraphs.

Conventionally, a tape drive includes a controller computer, including a microprocessor and storage to store the firmware of the tape drive upon. The firmware is providing the functions for interactions with attached external host-computers via SCSI-Commands to operate data IO between the magnetic tape drive and the host computer. The method of flowchart 999 reduces wear on a magnetic tape drive head and is based on known characteristics of magnetic tape drive response for locating the magnetic tape loaded into the magnetic tape drive to a dedicated position for reading or writing data from the position.

In the method of flowchart 999, starting the locate process is responsive to receiving an SCSI command "Locate (92-hex)" by the magnetic tape drive from a host computer. The new inserted process step following next to the locate command is initiating the magnetic tape drive to read the current location. After that the process is calculating the location difference between the current location and the location requested by the host. Thereafter the process calculates the time needed to spool to the target location of the tape based on distance in meters and the speed of the reel motor for spooling the tape to the target location. The next step includes controlling the spooling distance roughly. Then thereafter, in the follow up step the electric motor used to position the magnetic head of the tape drive on tape tracks will start to oscillate the magnetic tape head into +/−Y-direction up and down. While the active spooling is started, now the prior set timer starts to count, too. In this stage, the magnetic head supporting the tape oscillates all the way up and down. This maneuver of the tape head causes the tape to slide across the supporting rails of the magnetic head using the whole length and evenly use the surface of the head supporting rails. If, in the next step, the calculated target location is reached, the oscillation of the magnetic tape head is stopped and the invented process is moving the magnetic head onto the target location's servo track for reading and controlling the location signals. The last step is slowing down the magnetic tape spooling and finally locate the magnetic head to the exact, from the host requested, target location to prepare the magnetic tape drive for operating data IO on tape. The invented process then is finished.

Some embodiments of the present invention may include one, or more, of the following features, characteristics, operations and/or advantages: (i) means for moving read/write head in vertical direction for positioning the read/write head onto different data tracks on the tape; (ii) the moving means being characterized by adding a new control function to the means for moving read/write head for providing a "oscillating vertical direction" to the track direction during forwarding the tape to the target tape location for reading or writing data from or to the tape; and/or (iii) the oscillating frequency depends on distance to the target position of the read/write head to be forwarded.

Some embodiments of the present invention may include one, or more, of the following features, characteristics, operations and/or advantages: (i) means for moving read-write head include magnetic tape drive software building upon the oscillating method to equalize the head wear or what we called abrasion; (ii) after the tape location for TO-operation is reached, an added function is started and measures the data-track-read-signal amplitudes by using the magnetic tape head's read-element-head-array and available electronic amplification read channels; (iii) based on the detected signal amplitudes were analyzed across the multiple data-bands of a magnetic tape (for example, LTO/3592 standard a magnetic tape has 4 data-bands) this function moves the magnetic head to the area were the heads wear/abrasion is low (highest amplitude); (iv) the function adds a reference pointer on the data set stored that describes the track and position of the next data-set in sequence of the file/data stored on this tape; (v) with the method of the previously-described items in this list, the stored data is spread across all data tracks what equally utilizes the whole head surface and leveling out already worn areas; (vi) with this different read/write head calibration biases are set by the invented function which are based on different head positions; and/or (vii) with this read/write operation can be stabilized and the lifetime of a magnetic tape drive is extended.

Some embodiments of the present invention may include one, or more, of the following features, characteristics, operations and/or advantages: (i) the magnetic tape drive determines the abrasion level using the read amplitude during the drives initial calibration process right after the magnetic tape cartridge is loaded into the magnetic tape drive; (ii) based on this determination the drive decides on which track of the tape the data will be written to; (iii) does not require maintaining calibration data based on the magnetic head track or band position; and/or (iv) simply uses the magnetic tape areas with highest amplitude and distributes the data on the corresponding track.

Some embodiments of the present invention may include one, or more, of the following features, characteristics, operations and/or advantages: (i) a control-function is added into the magnetic tape library firmware; (ii) this invented library function is based on the usage statistics of each magnetic tape cartridge and tape drive; (iii) magnetic tape library data set maintains a log which magnetic tape cartridge was loaded into which magnetic tape drive; (iv) magnetic tape cartridges have a cartridge memory chip included that maintains the inventory of a magnetic tape and keeps track of how much data is currently stored on which track/wrap at the magnetic tape; (v) the control-function is a library function that captures the cartridge filling-statistics from the magnetic tape's cartridge memory chip short before unloading this cartridge; (vi) the magnetic tape library controller stores this information (Date & Time, Cartridge Barcode, End of Data Marker found on track/wrap number, Cartridge capacity or type—e.g. LTO1/2/ . . . 6/7, magnetic tape drive serial number) into the invented database at the storage of the library controller or a dedicated magnetic tape cartridge therefore; (vii) based on this information and the knowledge that the different data tracks are located on corresponding data band-sections on a magnetic tape, the control-function determines the potential wear of the different magnetic tape drives; (viii) with this information the invented function selects the magnetic tape drive which matches the already filled magnetic tape cartridge best for optimal operation; (ix) if the magnetic tape to be loaded into drive A by the application for IO processing and the magnetic tape already has data tracks/wraps filled only on band 0 and this tape is to be loaded into a magnetic tape drive that statistically had the most loads for operating data on wrap 0 already, controlling machine logic will select another magnetic tape that has the lowest operation history on wrap 0; (x) this selection to the host is done by spoofing the tape drives world-wide node name (e.g. wwnn); and/or (xi) with this method, the magnetic tape drives in combination with the fill-statistics of magnetic tape drives can evenly wear during operation to majorly extend the life time of magnetic tape heads.

In some embodiments of the present invention, the amplitude of the transverse direction oscillation of the head is made large enough to effectively counter uneven wear on the head. In some conventional tape drive devices, there may be some very limited transverse direction oscillation of the head when attaining, or maintaining, alignment with a track (for example, a servo track, a data track) defined on a tape medium being used with the tape drive. However, this type of oscillation is limited in amplitude because it is closely centered about a single track on the tape medium. In contradistinction, some embodiments of the present invention have an oscillation amplitude that is greater than the center-to-center transverse width of two data tracks. In some embodiments of the present invention, the amplitude of the oscillation will be equal to or greater than the center-to-center transverse width of half of the number of tracks on the type of tape medium with which the tape drive is designed to be used. For example, in a 32 track tape drive, the amplitude of the oscillation would be equal to or greater than the center-to-center transverse width of 16 tracks of the associated tape medium. In this way, it can be assured that the entire active transverse width of the head (that is, the entire width of the head that potentially comes in contact with the tape medium) will be "swept" by the relative oscillatory motion between the head and the tape medium.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A tape drive system for use with a tape medium that defines a longitudinal direction and a transverse direction, the tape drive system comprising:
    a magnetic head including a tape facing surface;
    a head movement control sub-system;
    a tape movement control sub-system; and
    a head profile sub-system;
    wherein:
    the magnetic head is structured, connected, located, sized and shaped to magnetically read data from and/or magnetically write data to the tape medium while the tape medium moves in the longitudinal direction relative to the tape facing surface of the magnetic head;
    the tape movement control sub-system structured and/or programmed to control movement of the tape medium, with the movement including longitudinal direction movement relative to the tape facing surface of the magnetic head;
    the head profile sub-system is structured and/or programmed to store head profile information corresponding to an observed and/or estimated wear profile of the tape facing surface of the magnetic head; and
    the head movement control sub-system and tape movement control sub-system are structured and/or programmed to control relative position and/or relative orientation of the tape facing surface of the magnetic head and a portion of the tape medium proximate to the magnetic head in a manner to counter uneven wear indicated by the wear profile information.

2. The system of claim 1 wherein the head movement control sub-system is further structured and/or programmed to move the magnetic head in the transverse direction to control relative transverse position of the tape facing surface of the magnetic head and a portion of the tape medium proximate to the magnetic head in a manner to counter uneven wear indicated by the wear profile information.

3. The system of claim 2 wherein the head movement control sub-system is further structured and/or programmed to move the magnetic head in the transverse direction to control relative transverse position of the tape facing surface of the magnetic head and a portion of the tape medium proximate to the magnetic head in a manner to counter uneven wear indicated by the wear profile information during fast forward type and rewind type operations performed by the tape drive system.

4. The system of claim 1 wherein the head profile sub-system is further structured and/or programmed to estimate the head profile information based upon historical data relating to usage and relative position of the magnetic head.

5. A method for use with an elongated magnetic tape medium defining a longitudinal direction and a transverse direction and a tape drive system including a magnetic head and a movement control sub-system, the method comprising:
    controlling, by the movement control sub-system, the magnetic tape to move in the longitudinal direction relative to the magnetic head such that various portions of the magnetic tape will come into close proximity to a tape facing surface of the magnetic head and the magnetic tape moves in the longitudinal direction; and
    while the magnetic tape is moving in the longitudinal direction, controlling, by the movement sub-system, the magnetic head to oscillate in the transverse direction.

6. The method of claim 5 further comprising:
    receiving, by the tape drive, a locate command including information indicative of a target longitudinal location on the tape medium;
    determining a locate time based upon a current longitudinal position of the tape medium, the target longitudinal location and a longitudinal speed of the tape medium in locate mode;
    calculating, by the movement control sub-system, a stopping time based upon the locate time; and
    stopping, by the movement control sub-system, the oscillation of the magnetic head at the stopping time.

7. The method of claim 6 wherein the calculation of the stopping time calculates the stopping time to be when ninety percent of the locate time has elapsed.

8. The method of claim 6 wherein the oscillation has a constant amplitude in the transverse direction.

9. The method of claim 6 wherein the oscillation has a constant period.

10. The method of claim 6 wherein a combined longitudinal and transverse motion pattern of the magnetic head with respect to the magnetic tape is sinusoidal.

11. A tape drive system for use with a tape medium that defines a longitudinal direction and a transverse direction, the tape drive system comprising:
a magnetic head including a tape facing surface;
a head movement control sub-system; and
a tape movement control sub-system;
wherein:
the magnetic head is structured, connected, located, sized and shaped to magnetically read data from and/or magnetically write data to the tape medium while the tape medium moves in the longitudinal direction relative to the tape facing surface of the magnetic head;
the tape movement control sub-system structured and/or programmed to control movement of the tape medium, with the movement including longitudinal direction movement relative to the tape facing surface of the magnetic head; and
the head movement control sub-system and tape movement control sub-system are structured and/or programmed to effect oscillatory movement during fast forward type and rewind type operations with respect to the relative transverse position of the tape facing surface of the magnetic head and a portion of the tape medium proximate to the magnetic head.

12. The system of claim 11 wherein:
the tape movement control sub-system is further structured and/or programmed to hold a portion of the tape medium proximate to the tape facing surface of the magnetic head at a substantially constant transverse position during the oscillatory movement; and
the head movement control sub-system is further structured and/or programmed to actuate transverse direction oscillatory motion by the tape facing surface of the magnetic head the oscillatory movement.

13. The system of claim 11 wherein the oscillatory movement has an amplitude that is greater than the center-to-center transverse width of two data tracks.

14. The system of claim 11 wherein the oscillatory movement has a constant amplitude in the transverse direction.

15. The system of claim 11 wherein the oscillatory movement has a constant period.

16. The system of claim 11 wherein a combined longitudinal and transverse motion pattern of the magnetic head with respect to the tape medium is sinusoidal.

17. The system of claim 11 wherein the head movement control sub-system and tape movement control sub-system are structured and/or programmed to effect the oscillatory movement during a locate mode that occurs in response to a locate command.

* * * * *